United States Patent [19]

Shapiro

[11] Patent Number: 5,204,702
[45] Date of Patent: Apr. 20, 1993

[54] APPARATUS AND PROCESS FOR RELIEVING EYE STRAIN FROM VIDEO DISPLAY TERMINALS

[75] Inventor: Allan W. Shapiro, Oakland, Calif.
[73] Assignee: RAMB, Inc., Burlingame, Calif.
[21] Appl. No.: 685,344
[22] Filed: Apr. 15, 1991
[51] Int. Cl.$^5$ .............................................. G02C 7/02
[52] U.S. Cl. .................................... 351/175; 351/170
[58] Field of Search ............... 351/170, 171, 175, 158, 351/41; 359/809

[56] References Cited

U.S. PATENT DOCUMENTS 5,076,665 12/1991 Petersen ............................ 351/175

Primary Examiner—Rodney B. Bovernick
Assistant Examiner—Hung Xuan Dang
Attorney, Agent, or Firm—Townsend and Townsend

[57] ABSTRACT

Eye glasses in combination with a video display terminal and a process of eye glass prescription for workers utilizing video display terminals are disclosed. At least one diopter of base in (nasal or towards the nose) prism dioptric correction is utilized in combination with accommodation relaxing spherical prescription. This prism and sphere is superimposed upon normal eye prescription for accommodation and convergence of the eye at the working distance of the information display surface of the video display terminal. Preferred location of the lens center is exactly over the pupil of the eye when the eye views straight ahead in the orthophoric state or at the distance the screen will be viewed. There results an eye glass and eye glass prescription in combination with a video display terminal in which the patient viewing the video display terminal has both reduced and relaxed convergence and accommodation. The absence of eye strain due the accommodation reflex, panning over the positive spherical component of glasses, and loss of light from stopping down of the pupil is reduced. The eye glasses have preferred use with injection molded plastic lenses having the required sphere and prism molded into the lenses. In the preferred embodiment, the transparent plastic of the lenses is impregnated throughout with ultra violet and infrared filtering media and provided with anti reflective coatings on the lens surfaces.

8 Claims, 3 Drawing Sheets

APPARATUS AND PROCESS FOR RELIEVING EYE STRAIN FROM VIDEO DISPLAY TERMINALS

This invention relates to eye glasses in combination with video display terminals and a process of prescribing glasses for patients who use video display terminals. Specifically, base in prism is combined with positive sphere for the relief of eye fatigue from the observation of video display terminals.

BACKGROUND OF THE INVENTION

It has now become extremely common for the modern office worker to use video display terminals. The use of such terminals in some job assignments goes on for hours on end—often without rest of the eyes or relief of the worker. Worker fatigue, especially through strain of the eyes, has become common.

Unlike the former clerical tasks accomplished on paper, video display terminals have special viewing problems. A summary of these viewing problems can be instructive.

First, the video display terminal is a light source. Many portions of the screen emit light, especially when color terminals are used. Second, the patient is required to focus on and observe closely the light emitting screen at an information area. Such an information area is usually the light emitting "cursor" on the surface terminal where information of computer input or output is displayed. Third, and due the fact that the video display terminals are all covered with a transparent glass coating, the terminals themselves are sources of reflection, these reflections interfering with the subject matter to be viewed. Artificial and natural light is reflected from the screens into the eyes of the concentrating viewer. In short, viewing conditions that would never be tolerated in an ordinary reading situation are required viewing conditions when working with video display terminals.

The eye strain problem associated with video display terminals is now notorious. Ordinances and laws are being passed for the safety of the video display terminal worker.

Obvious corrective measures have been undertaken. These measures include glasses with ultra violet filters, infrared filters, and anti reflective coatings. Similarly, polarizing filters have been placed on the surfaces of the video display terminal screens. All this has been coupled with improved abient lighting systems (usually with downward collimated illuminating light).

Unfortunately, the difficulties of the video display worker are usually compounded with age. It is well known that the eye undergoes an aging process which makes accommodation for the viewing of objects at "reading distance" increasingly more difficult. At least two effects contribute to this aging effect, which effect requires most adults over 45 years of age to require "reading glasses." The lens of the eye becomes less elastic with age. The eye muscles that normally produce accommodation, must work harder to achieve accommodation.

The traditional cure of the emmetrope (person with normal vision) loosing his power of accommodation is to supply so-called "reading glasses." Reading glasses are nothing more than a positive spherical prescription.

DISCOVERY

I have noted at least three effects which when combined render the "reading glass" solution less than optimal for the video display terminal worker.

First, when the eyes accommodate a near object, there is an involuntary attempt upon the part of the eyes to converge responsive to the eye accommodation, whether this accommodation is required or not. Specifically, the ciliary muscle which controls the accommodation of the eye shares a nerve with the medial rectus muscle which effects the convergence of the eye. The reader will understand that where "reading glasses" are used, less accommodation is required, depending on the viewing distance, size of the object and the dioptric strength of the reading lens. Nevertheless, where accommodation of the eyes occurs through reading glasses, convergence will still be attempted by the eye as part of a natural reflex due to the common shared nerve.

Secondly, reading glasses are typically supplied with positive sphere for the aging emmetrope. Assuming that the emmetrope must concentrate on a near object, panning of the eyes to a position of nasal convergence must occur to avoid diplopia (double vision). Unfortunately, nasal convergence on a positive spherical lens provides prism that is the opposite of that prism required for convergence through a near object.

This phenomenon can be understood. Referring to the simple diagram of FIG. 1B, it will be remembered that light L is bent by a prism P towards the base of the prism and away from the apex of the prism. Referring to FIG. 1A, spherical eye glass lenses 14 and 16 are shown with the eyes $E_r$ and $E_l$ of a viewer V converging on and observing the letter "T" on the video display terminal 20. Typically, the video display terminal is in the range of 12 to 30 inches from the viewer V.

When such observation occurs, the eyes $E_r$ and $E_l$ will converge along a radial line. As the eyes were originally centered on the so-called neutral portion of the spherical lenses 14, 16, convergence produces a prism which increases in intensity as one pans the eyes towards the edges of the lenses 14, 16. This prism, however, bends light back to and toward the center of each lens 14, 16. If convergence is required to view a near object, and the eye pans from the center of the lens towards the nasal inside edge of the spherical lens to effect such convergence, the natural prism provided by traditionally prescribed spherical "reading glasses" will be opposite to the required convergence. In other words, reading glasses do not assist convergence as the eye pans from the center of a positive spherical lens to the medial edge of the positive spherical lens to effect vision on a near object; reading glasses resist convergence as the eye pans form the center of a positive spherical lens to the medial edge of a positive spherical lens to effect vision on a near object.

Thirdly, there is a natural pupillary reflex stopping down the diameter of the pupil as the eye accommodates or attempts to accommodate. This reflex is known as the iris sphincter reflex. Specifically, accommodation of the eye enervates the constrictor muscle of the iris. This natural phenomena gives the eye greater "depth of field" when viewing an object at close range. This generally assists accommodation on close objects by increasing the depth of field or range of distances from the eye over which the objects can be discerned with clarity. However, this same effect reduces the light available, restricts the entering light to largely parallel collimated rays, and makes contrast determination more difficult. As a consequence, further eye fatigue can result. This further fatigue is especially present when combinations of light reducing filters together with anti reflective coatings are utilized with the eye glass lenses.

The reader will appreciate that the forgoing problems are generally unrecognized—especially in their combination—when working with video display terminals. Accordingly, and in recognizing the solution herein to the problem of viewing video display terminals, I claim as part of that invention the recognition of these symptoms acting in combination to render viewing of video display terminals difficult.

SUMMARY OF THE INVENTION

Eye glasses in combination with a video display terminal and a process of eye glass prescription for workers utilizing video display terminals are disclosed. At least one diopter of base in (nasal or towards the nose) prism dioptric correction is utilized, in each lens, in combination with accommodation relaxing spherical prescription. This prism and sphere in combination may be superimposed upon normal eye prescription for accommodation and convergence of the eye at the working distance of the information display surface of the video display terminal. Preferred location of the spectacle lens center is exactly over the pupil of the eye when the eye views straight ahead in the orthophoric state. There results an eye glass and eye glass prescription both in combination with a video display terminal in which the patient viewing the video display terminal has both reduced and relaxed convergence and accommodation. The absence of eye strain due the accommodation reflex, panning over the positive spherical component of glasses, and loss of light from stopping down of the pupil is reduced. The eye glasses have preferred use with injection molded plastic lenses having the required sphere and prism molded into the lenses. In the preferred embodiment, the transparent plastic of the lenses is impregnated throughout with ultra violet and infrared filtering media and provided with anti reflective coatings on the lens surfaces.

The prescriptive process herein set forth can be understood another way. The spherical power added relaxes accommodation. Once this accommodation is relaxed, there is an accompanying relaxation of convergence. The prism in the eye glasses compensates for this relaxation of convergence A more comfortable long term view with reduced fatigue results.

BRIEF DESCRIPTION OF THE DRAWINGS

Other objects, features and advantages of this invention will become more apparent after referring to the following specification and attached drawings in which.

DESCRIPTION OF THE PREFERRED EMBODIMENT

Figure 2:
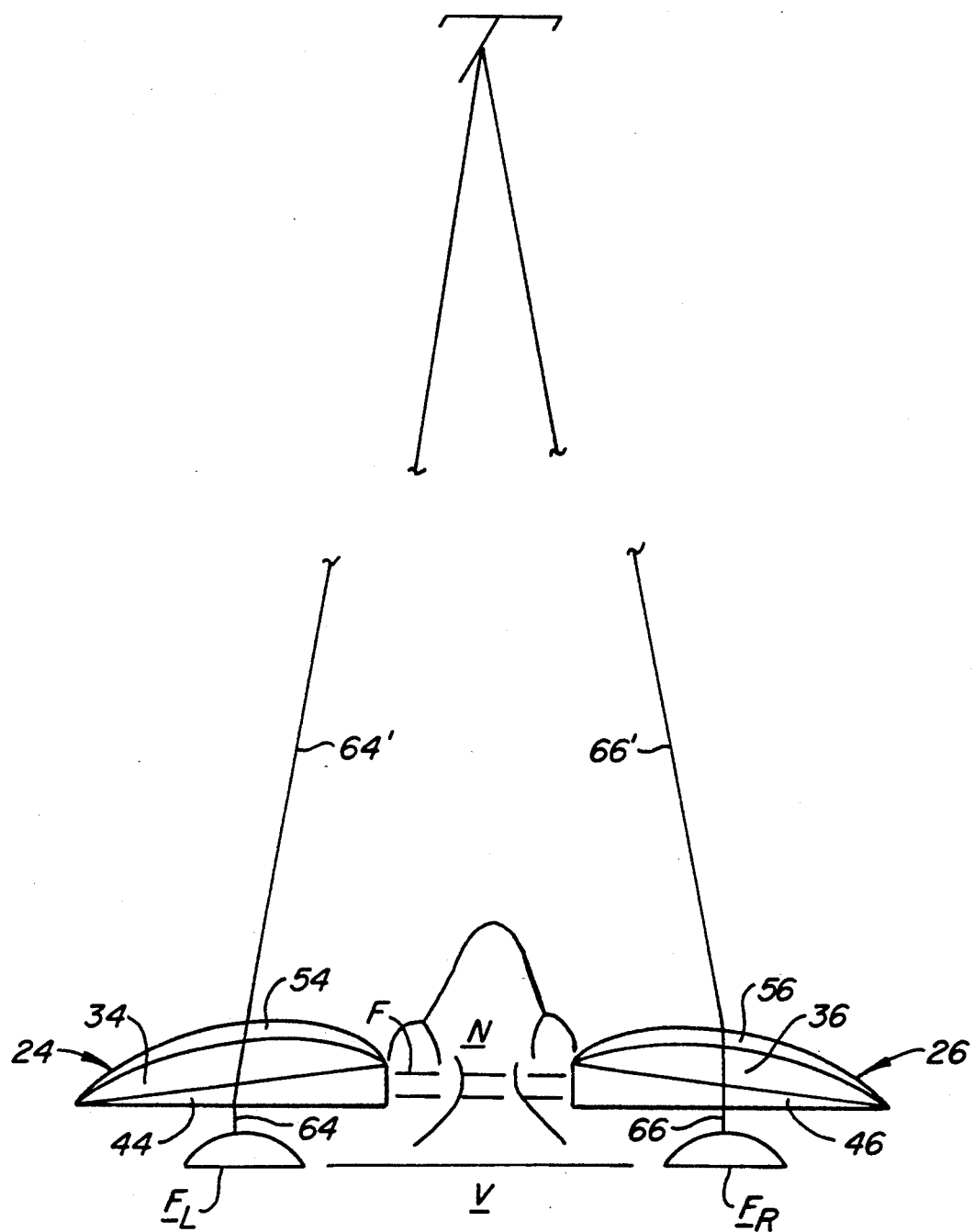
FIG. 2 is a plan view of the prism of the prescription applied herein illustrating the line of sight from each pupil of the eye to a video display terminal.

Referring to FIG. 2, a prescription according to the present invention is illustrated. Two eyeglass lenses 24, 26 are illustrated with eyeglass lens 24 being centrally over left eye $E_L$ and eyeglass lens 26 centrally over right eye $E_R$. As will be set forth in FIGS. 4A and 4B, frames F are presumed, but not completely shown, so that the invention may be understood.

The lenses 24, 26 are shown in three individual components. These components are here described so that the reader may understand the sum of the prescription by observing the component parts. In actual fact, the lenses will be ground or molded in a unitary configuration, with no lines of demarcation between the lens components.

The viewer's original spherical prescription 34 on lens 24 and 36 on lens 26 is present. This prescription has been augmented in two respects.

First, there is provided a base-in prism component 44 on lens 24 and 46 on lens 26. It can be seen that the base of the prism is disposed towards the nose end of the viewer. Base-in prism added to the viewer's prescription is normally on the order of one prism diopter.

Secondly, a spherical component 54, 56 has been added to the prescription. This spherical component is added so that the eyes $E_L$ and $E_R$ relax in their accommodation.

Having set forth the components of the prescription, attention can now be devoted to the effects provided.

First, (and for an oversimplified explanation) a principal ray has been traced from each eye to and towards the target letter T (which letter T appears upon the information display surface of a video terminal 20 (see FIG. 1A)). However, it will be observed that the principal ray 64 for eye $E_L$ and 66 for eye $E_R$ is straight ahead and parallel as if the viewer were looking at an object at an infinite distance in what is technically known as the orthophoric state. In other words, the viewer looks straight ahead at a distance while the respective prisms components 44, 46 provide the required convergence of the rays 64', 66' to converge on the letter T.

The reader having skill in the art will recognize that the above statement is only precise if the full amount of near point power is provided by the glasses. If only part of the total power is provided, then the eye will be accommodating the rest of the power and the object will not appear to be at infinity.

Secondly, it will be observed that sphere components 54, 56 have been added to the lenses 24, 26. Such spherical components effect relaxation of the eyes.

As an example of a prescription I set forth Table I:

TABLE 1

Accommodation/Accommodative Convergence (AC)
(Distances in Metric System) vs. viewing distance

| Viewing Distance | Accommodation (A) | Convergence |
|---|---|---|
| 1 meter (100 CM) | 1 Diopter (D) | 4 Δ |
| 20" .5 meter (50 CM) | 2 D | 8 Δ |
| 10" .25 meter (25 CM) | 4 D | 16 Δ |

Accommodative distance determines the amount of focusing power necessary to clearly view the "Object of Regard." For example, the accommodative power necessary to view a object at 20" (2.5 cm=1") or 50 CM—2D using formula 4Δ of convergence at 20", then reducing the viewing distance to 10" increases the accommodative requirement to 4D and the convergence to 16Δ.

The difference between the presbyope and the emmetropic (non presbyope) is the emmetropic nonpresbyope provides the accommodative power and the associated convergence. Therefore the emmetrope (non presbyope) provides muscle effort from both intraocular and extraocular muscles.

The presbyope (either emmetropic or non emmetropic) depends on near point power prescription to provide the accommodative power. The needs for prismatic assistance are usually ignored. With this invention, base in prism is supplied to provide a part of the muscle alignment necessary to facilitate binocular vision at near.

Stopping here, the process of prescription can be more fully understood. I have here shown the standard prescription for an aging emmetrope. For such a person, an infinitely distant object is sharply imaged on the retina without inducing an accommodative response. In the case of the emmetrope here shown, this person, through age, has presbyopia. Simply stated, there has been a reduction in accommodative ability, (due at least to sclerotic changes in the crystalline lens) necessitating a positive spherical lens 34 when viewing close objects.

It will be seen that the base-in prism 44, 46 affects convergence of the line of sight of eyes $E_L$ and $E_R$, although those lines of sight are gazing straight ahead in the orthophoric state. Further, it can be seen that additional spherical components 54, 56 are provided. These components allow an eye in the orthophoric state to see the letter T in clear focus without accommodation. The reader will remember that all of this prescription depends upon strength of the glasses, the degree of presbyopic, and the size and distance of the object.

It has been found that the eyeglasses herein utilized have a remarkable effect on the reduction of eyestrain.

Figure 3:
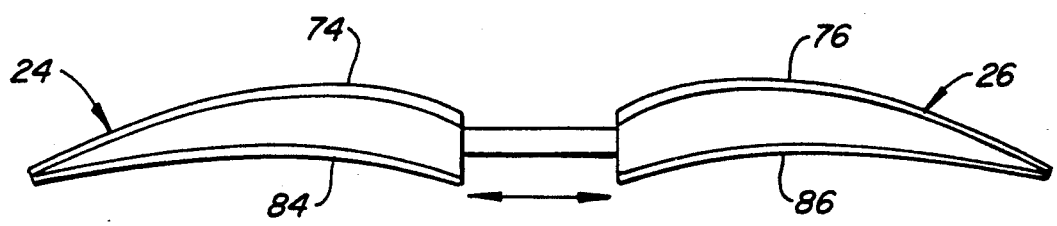
FIG. 3 is a section across a two pair of eye glass lenses utilized in glasses designating the preferred locations of infrared, ultra violet, anti reflective coatings on the glasses together with an over emphasized section across the lenses showing the simultaneous presence of sphere and prism; and, FIG. 4A is a perspective view of eye glass frames with having an adjustable bridge to the fame to provide the wearer with a personally adjusted interpupillary distance; and, FIG. 4B is a view of the glasses of FIG. 4A in the assembled disposition.

Having set forth this much, the augmentation of these lenses with filters and coatings can be understood with reference to FIG. 3.

Referring to FIG. 3, a cross-section of two injection-molded plastic lenses is disclosed. The lenses are impregnated in their plastic with materials having ultraviolet and infrared filtering capabilities.

Anti-reflective coatings 74, 84 are added to the front and rear surfaces of lens 24. Likewise, anti-reflective coatings 74, 86 are added to the front and rear surfaces of lens 26.

The combination disclosed in FIG. 3 has more practical significance than first meets the eye. Specifically, anti-reflective coatings can only be on the surfaces of lenses. This relegates the filtering materials to being placed within the lenses. At the same time, filtering materials placed within laminations are generally unsatisfactory. It is therefore preferable that the filtering media be dissolved within plastic lenses.

The reader will understand that by far the majority of the population are closer to the emmetropic state than those individuals requiring prescription.

Figure 1A:
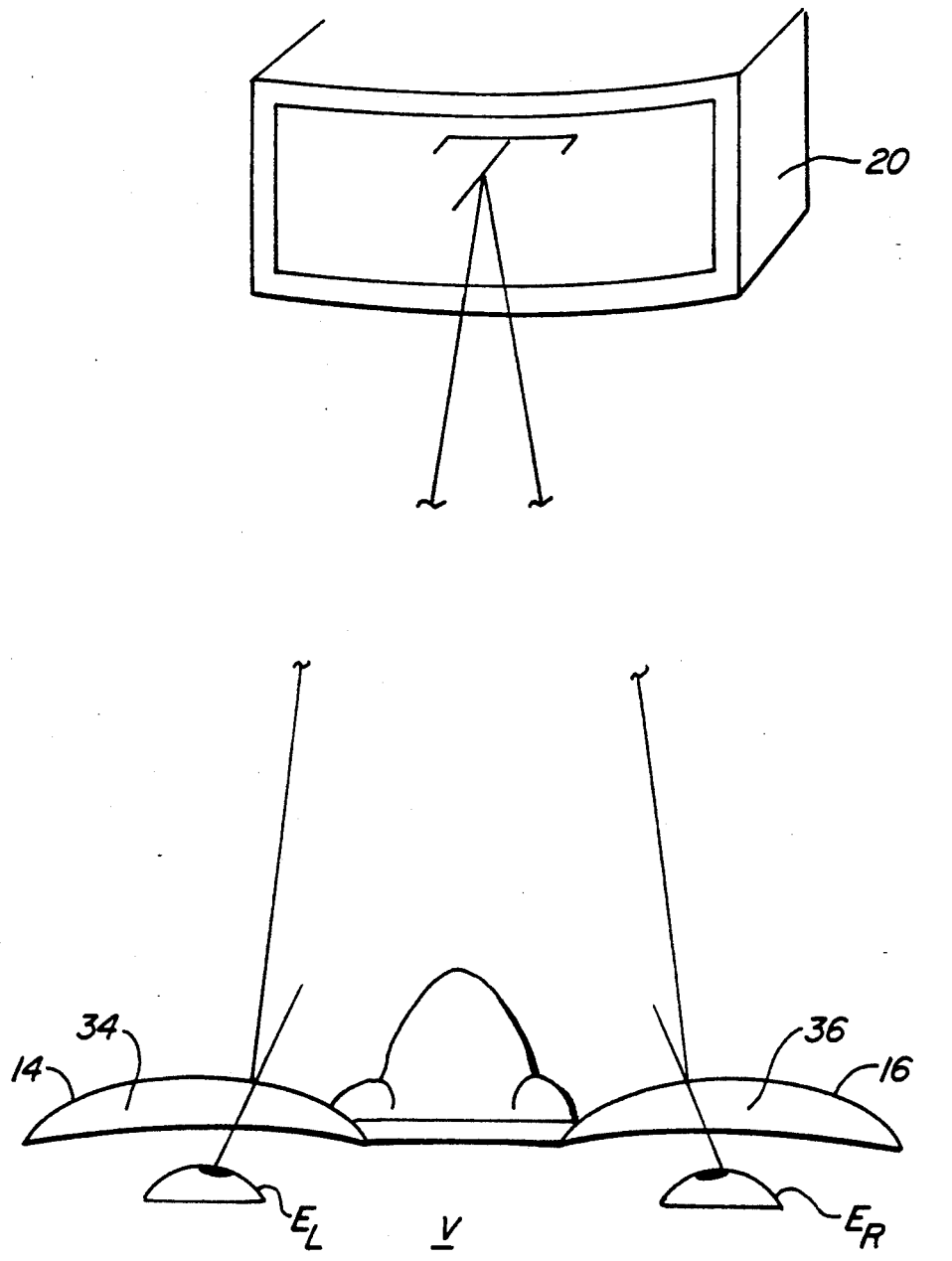
FIG. 1A is a plan view of a pair of eyes panning over a prior art positive spherical prescription commonly associated with "reading glasses" illustrating the principle that such panning produces prism opposite to that required to produce convergence.
Figure 1B:
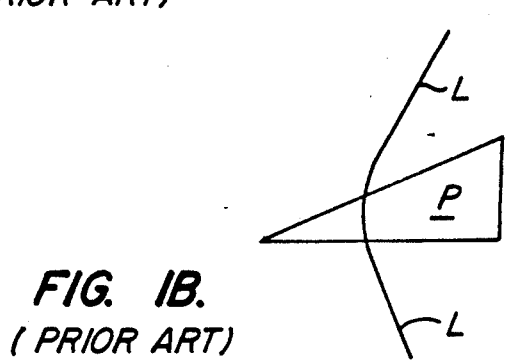
FIG. 1B is a simple diagram of light passing through a prism so that the reader can understand the base in power associated with positive spherical lenses.

As can be remembered from FIG. 1A, it is important that the lens be centered over the eye of the viewer V. At the same time, it is common practice for stores to vend eyeglasses. Accordingly, and with the eyeglasses herein, at FIGS. 4A and 4B, I disclose an eye frame having an adjustable nose bridge.

Figure 4A:
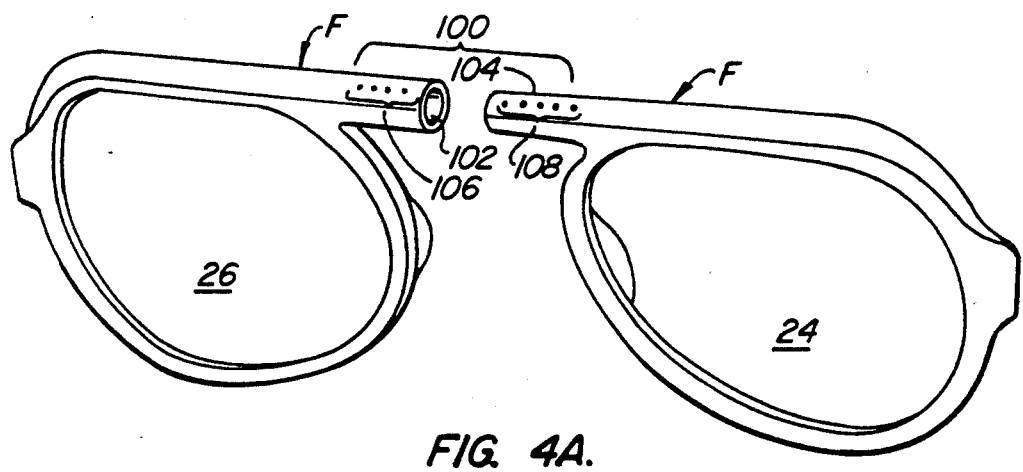

Referring to FIG. 4A, frame F is divided into first and second lens encircling portions for encircling lenses 24, 26. The bridge 100 of the frame is provided for varying the interpupillary distance. Specifically, that portion of frame encircling lens 26 is provided with a female receptacle 102. That portion of the frame bordering lens 24 is provided with a male receptacle 104. A series of aligned holes 106 in female aperture 102 mates with holes 108 on male aperture 104.

Figure 4B:
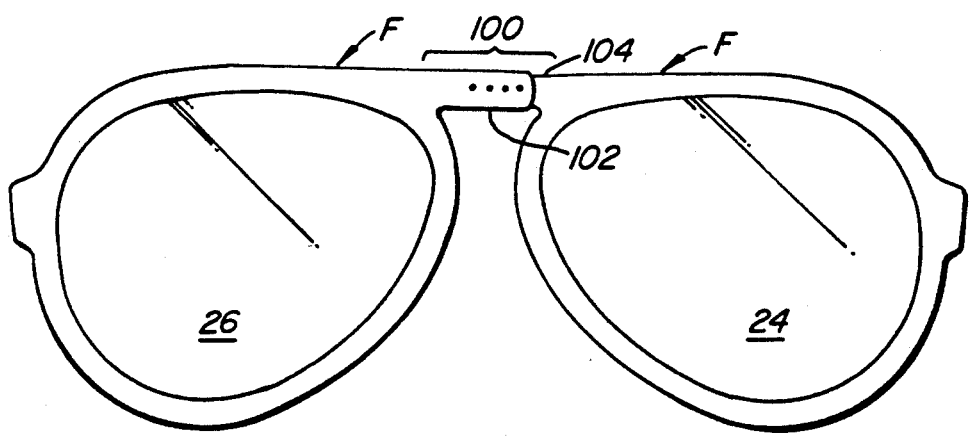

Referring to FIG. 4B, use of the eyeglasses can be understood. Specifically, the bridge distance 100 has been adjusted by placing male aperture 104 in female aperture 102 and placing a short pin across registered holes 106, 108 (the pin not being shown). The idea behind such a frame is to permit the viewer V to adjust store purchased glasses having the requisite prescription to his or her own interpupillary distance.

It will be appreciated, that in setting forth my method of prescribing a patient, that I mean my prescription herein set forth for the video display terminal to be superimposed upon a normal reading glass prescription for a patient. Thus I have illustrated the addition of positive sphere.

The reader will realize that there are many members of the general population whose eyes require negative spherical correction as well as prism that is other than base in prism. In order to accommodate the video display terminal problem set forth in FIG. 2, I would add to these prescriptions the prism component 44, and spherical component 54 as shown on lens 24, and the prism component 46 and spherical component 56 as shown on lens 26. While such an addition may in fact result in overall prism quite different from that utilized by the emmetrope, it is to be understood that it is included within this disclosure.

What is claimed is:

1. In a process of prescribing glasses for use by a patient viewing video display terminals at a viewing distance in the range of 12 to 30 inches over extended periods of time having the steps of:

refracting said patient to determine sphere, cylinder, and prism for view of said video display terminal at said viewing distance; and determining an eye glass prescription for two eye glasses lenses for said patient at said viewing distance wherein said patient when wearing said eye glasses has prescribed power of accommodation and power of convergence in prism to keep said terminal in focus;

the improvement to said process of prescription including the steps of:

providing to each lens of said patient base in prism sufficient to enable said patient to gaze with relaxed eye convergence towards the orthophoric state at said video display terminal; and, providing to each lens of said patient eye glasses sphere of at least one diopter or more sufficient to relax said patient power of accommodation wherein said power of convergence in prism is no more than four times the power of said accommodation.

2. The process of claim 1 and wherein said process of prescription includes the steps of:

providing a lens having an infrared filter.

3. The process of claim 1 and wherein said process of prescription includes the step of:

providing a lens having an ultra violet filter.

4. The process of claim 1 and wherein said process of prescription includes the step of:

providing said eye glasses lenses with anti reflective coatings.

5. In combination with a video display terminal having a light emitting surface for the display of video information; eye glasses for placement over the eyes of an operator viewing said video display terminal at said light emitting surface to observed said displayed video information; wherein said eye glasses on said operator are for providing a view of said video display terminal, said eye glasses having a prescription enabling view of said video display terminal at said light emitting surface to observe said displayed video information;

the improvement to said eye glass prescription comprising in combination:

base in prism added to each eye glass lens sufficient for relaxing convergence of said operator toward the orthophoric state when said operator views said information surface of said video display terminal; and, positive sphere of at least one diopter or more added to each eye glass lens sufficient for relaxing accommodation of said operator toward said orthophoric state when said operator views said information surface of said video display terminal wherein said positive sphere for accommodation is one quarter or less than said base in prism.

6. The invention of claim 5 and wherein said improvement to said eye glass prescription includes:

a plastic lens having infrared and ultra violet filter material within said lens.

7. The invention of claim 5 and wherein said eye glass lens is coated with anti reflective coatings.

8. In a process of refracting a patient for viewing of a video display terminal having the steps of:

refracting said patient to determine sphere, cylinder, and prism for view of said video display terminal at said viewing distance; and, determining an eye glass prescription for two eye glass lenses for said patient at said viewing distance wherein said patient when wearing said eye glasses has prescribed power of accommodation and power of convergence in prism to keep said terminal in focus;

the improvement to said process of prescription including the steps of:

providing to each lens of said patient base in prism sufficient to enable said patient to gaze with relaxed eye convergence at said video display terminal; and, providing to each lens of said patient eye glasses sphere of at least one diopter or more sufficient to relax said patient power of accommodation;

wherein said power of convergence in prism is no more than four times the power of said accommodation.

* * * * *